INVENTOR.
THEODORE A. WETZEL

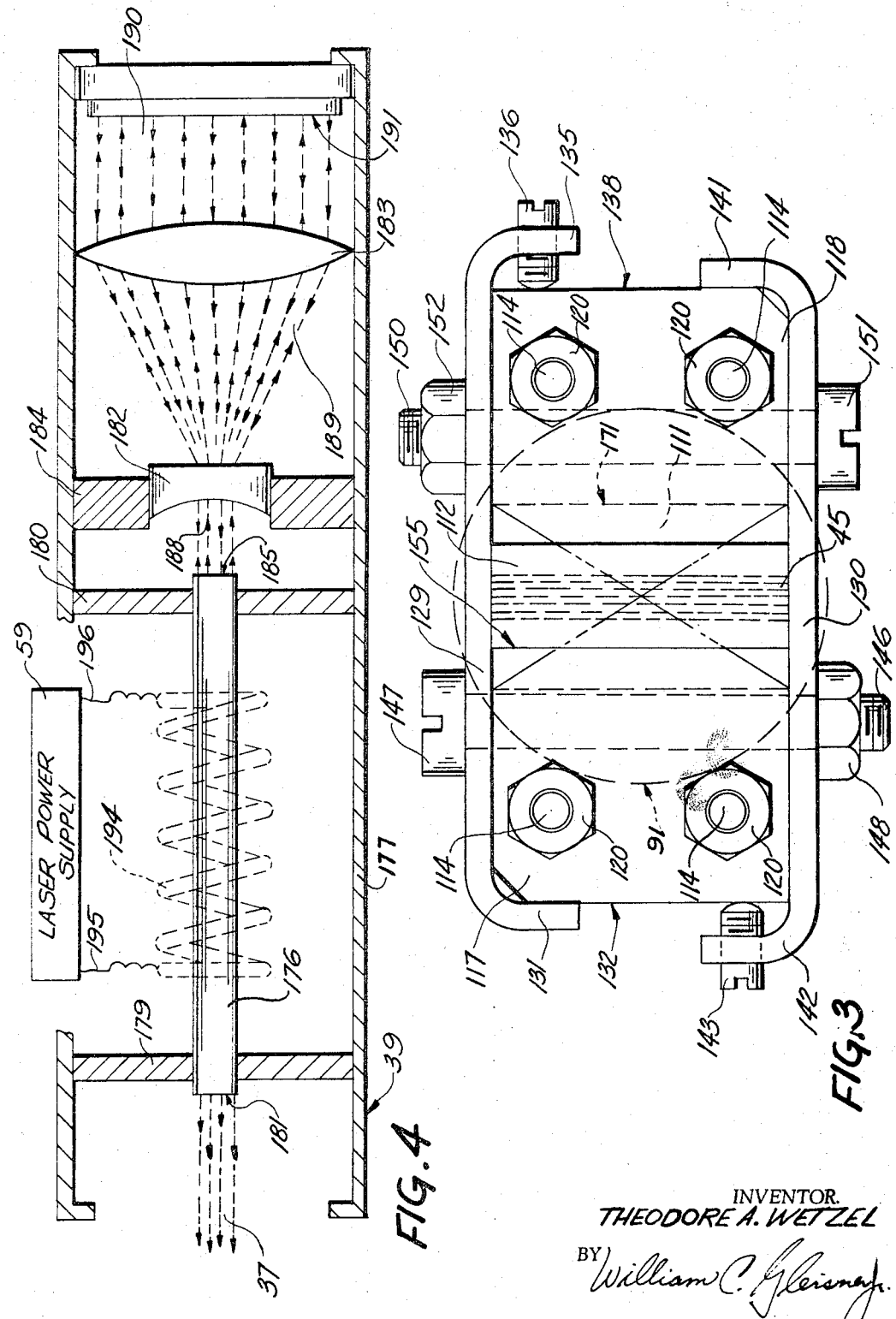

INVENTOR.
THEODORE A. WETZEL
BY William C. Gleason Jr.

United States Patent Office 3,422,246
Patented Jan. 14, 1969

3,422,246
LASER CUTTING MACHINE TOOL
Theodore A. Wetzel, Brookfield, Wis., assignor to Kearney & Trecker Corporation, West Allis, Wis., a corporation of Wisconsin
Filed Aug. 18, 1965, Ser. No. 480,704
U.S. Cl. 219—121                                  6 Claims
Int. Cl. B23k 9/00; B23k 9/16

ABSTRACT OF THE DISCLOSURE

A laser machine is adapted to form metal by means of a laterally movable laser beam of predetermined rectangular shape. The machine comprises a base having a movable table adapted to support a workpiece, and also having a relatively movable beam projecting cutting head. A metal cutting laser is carried by the cutting head in a position to project a collimated laser cutting beam in the direction of a workpiece supported by the movable table. A beam shaping apparatus is rotatably carried by the cutting head in axial alignment relative to the laser beam and above the worktable. To form the beam in selected rectangular shape, the rotatably positionable apparatus comprises an axially aligned beam enlarging lens system, a mask having a rectangular aperture adapted to pass a reduced portion of the enlarged beam, and a second lens system adapted to refocus the rectangular beam into an intense collimated beam of reduced rectangular cross section.

---

According to this invention, a machine tool is provided with a laser for projecting a coherent metal cutting beam toward a workpiece mounted on a cooperatively movable work support. Optical means are provided to shape the generally cylindrical laser beam into a rectangular laser beam particularly suited for configuring. Automatic drive means are connected to angularly orient the rectangular laser beam in a manner that the cutting beam is continuously maintained in a predetermined parallel relationship to a cutting movement.

The foregoing and other objects of the invention which will become more fully apparent from the following detailed description of exemplifying apparatus, may be achieved by the particular laser cutting machine tool described herein as a preferred embodiment thereof in connection with the accompanying drawings, in which:

FIG. 3 is a fragmentary view of the rectangular beam output portion of the beam shaping apparatus;

FIG. 4 is an enlarged fragmentary view of a laser; and,

Figure 1:
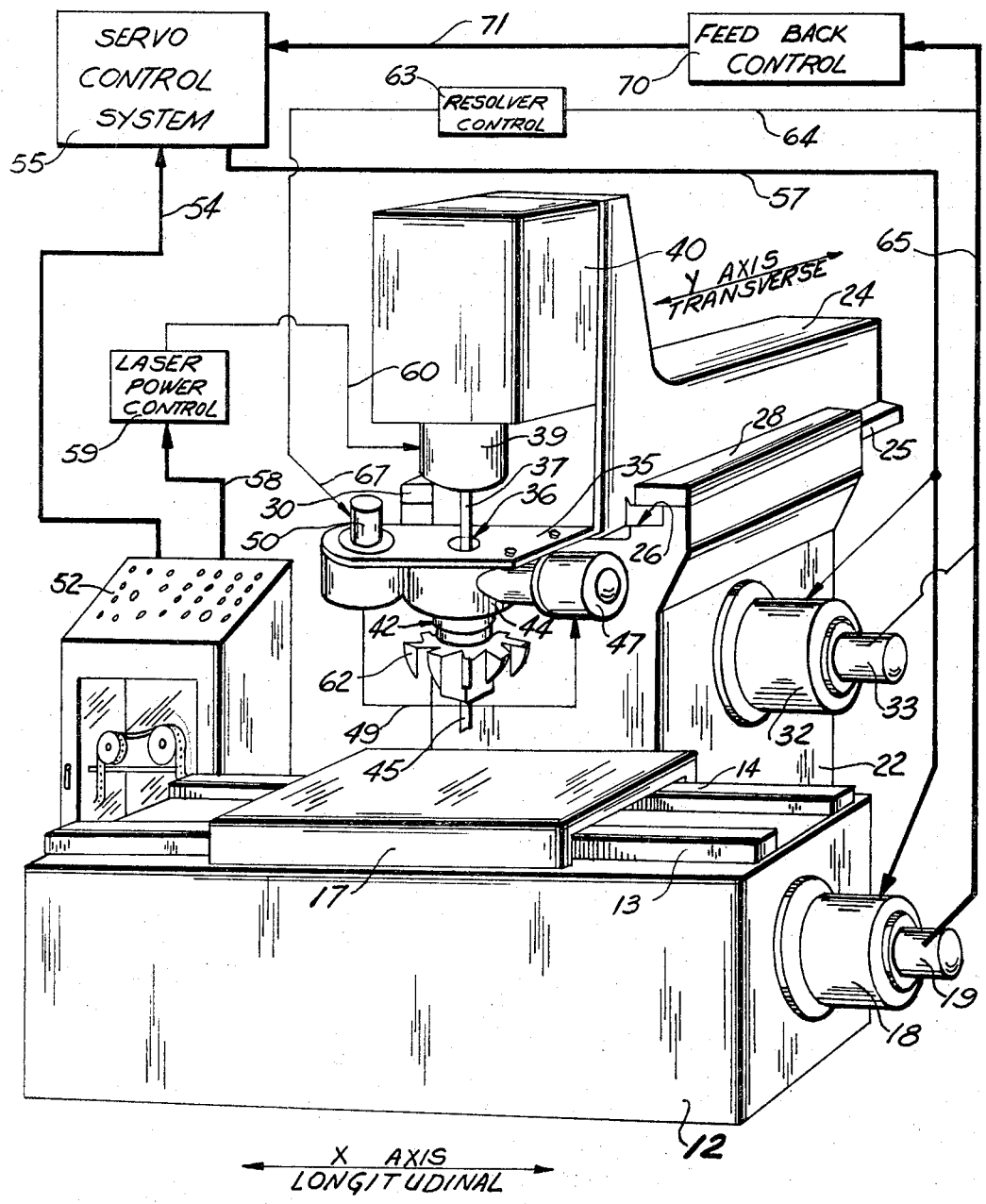
FIGURE 1 is an enlarged detailed view, partly diagrammatic and partly perspective, of a laser cutting machine tool embodying the principles of this invention.

Referring now to the drawings, there is shown in FIGURE 1 a laser cutting machine tool constituting a preferred embodiment of this invention. The machine comprises a supporting base having longitudinal ways 13 and 14 adapted to slidably support a worktable 17 for rectilinear, longitudinal sliding movement along an X axis. Although not shown in FIGURE 1, it will be understood that a table screw nut depending from the worktable is engaged by a rotatable table screw (not shown) that is connected in well-known manner to be rotatably driven by a reversible, servo drive motor 18. The X axis servo motor 18 is mechanically coupled in well-known manner to drive a tachometer generator 19 which is connected to provide a feed back control signal for controlling the speed of the servo motor 18 at selected rate.

Rearwardly of the worktable 17, a vertically upstanding column 22 is secured to the machine base 12. The upper portion of the column 22 is provided with spaced apart parallel guideways respectively disposed to slidably engage flanged ways secured to the opposite sides of a work cutting head 24. Only the right flanged way 25 of the head 24 is shown in FIGURE 1 as being maintained in engagement with the right horizontal column way 26 by a gib 28. In similar manner, the opposite way (not shown) secured to the cutting head 24 is retained in guiding engagement with cooperating left column way (not shown) by means of a gib 30. Both of the gibs are removably bolted directly to the column in well-known manner, as shown in FIGURE 1.

The usual screw and nut translating mechanism (not shown) is operatively interconnected between the cutting head 24 and the column 22 for effecting rectilinear movement of the head along a Y axis. Movement of the cutting head 24 along the Y axis is effected in response to selective energization of a reversible servo drive motor 32. The Y axis servo drive motor 32 is mechanically connected to drive an associated tachometer generator 33. The tachometer generator 33 is electrically connected in well-known manner to supply an electrical feedback signal to the servo control system for the Y axis motor 32, thereby regulating its speed at selected rate.

The forward portion of the cutting head 24 is provided with a forwardly extending flanged support plate 35, having a central beam receiving aperture 36 aligned with a laser output beam 37.

As shown in FIGURE 1, the laser beam 37 is directed vertically downward from a laser 39 carried in fixed relationship by a forwardly extending portion 40 of the cutting head 24. As known in the art, the output beam 37 from the laser 39 is generally circular in its cross sectional configuration. To more effectively perform metal cutting operations, the circular laser beam 37 enters the aperture 36 and is directed into a beam forming apparatus 42 rotatably carried by a stationary housing 44 fixedly secured to the underside of the head support plate 35.

During its passage through the rotatable beam shaping apparatus 42, the circular entrant laser beam is changed into a rectangular or "chisel shaped" output beam 45. Although the rectangular output beam may be of any selected dimension within the power capacity of the laser, it is preferably .020 of an inch by .120 of an inch in size. Upon striking metal that is to be formed, the rectangular output beam "cuts" that metal to provide a rectangular opening therein that approximately corresponds to the cross-sectional shape of the laser cutting beam 45. Because of the rectangular shape of the laser beam, therefore, it is necessary to properly orient the entire beam shaping apparatus 42 and the rectangular output cutting beam 45 during a metal forming operation. For example, during longitudinal movement of the worktable along the X axis to effect a rectilinear cut in a workpiece (not shown), the beam shaping apparatus 42 is angularly rotated in a manner that the rectangular shaped laser beam is parallel to the direction of worktable movement. In other words, the long edge (.120 inch) of the laser beam is maintained parallel to the direction of the cut to be effected in the workpiece (not shown).

In a similar manner, with the worktable maintained in stationary position, the cutting head 24 is movable along the Y axis to effect a rectilinear "cut" in a workpiece (not shown). During such a laser cutting operation along the Y axis, the beam shaping apparatus 42 is caused to be rotated 90° for maintaining the rectangular laser beam 45 parallel to the Y axis of movement. In other words, irrespective of the angular direction of a laser cutting operation, the beam shaping apparatus 42 is angularly positioned to effect a corresponding angular positioning of the rectangular laser beam 45 therefrom with its long edge parallel to the direction of cutting movement. During an arcuate cut, as would be effected by simultaneously energizing both servo motors 18 and 32 at predetermined varying rates, the beam shaping apparatus 42 is dynamically repositioned in a manner to continuously maintain the rectangular laser beam 45 tangent to the arcuate path of cutting travel.

To effect the required angular orientation of the rectangular laser beam 45, the beam shaping apparatus 42, is connected to be selectively rotated by a servo motor 47. The required angular orientation of the servo motor 47 is effected by an A.C. error signal 49, as indicated by the block diagram in FIGURE 1, from a resolver 50.

To provide the proper directional signal, the resolver 50 is responsive to the coordinate signals from the tachometer generators 19 and 33 respectively associated with the X and Y axes of movement. As shown in FIGURE 1, both the resolver 50 and the servo motor 47 are secured to the stationary housing 44 depending from the fixed support plate 35.

As shown in block diagram form in FIGURE 1, the machine schematically represented may be controlled by a numerical control system contained within a control cabinet 52. Predetermined machine movements are effected in the usual manner from a control tape in the cabinet 52, and which functions to provide speed and positional command signals along a channel 54 to a servo control system 55. From the servo system 55, command signals are transmitted along an output conduit 57 for effecting velocity, directional and positional control of the servo motors 18 and 32 respectively. At a predetermined position of the workpiece (not shown) in response to actuation of the servo control system 55, the numerical control system 52 operates to transmit an output command signal along an output conduit 58 to render a laser power supply 59 operable for transmitting power along the conduit 60 to activate the laser 39 sufficiently to perform the required metal cutting operation. This arrangement provides for programming the operation of the laser, as well as for controlling the intensity of the emitted metal cutting beam and the duration of its activation in performing a particular metal forming operation. A plurality of radially disposed cooling fins, such as the cooling fin 62, are carried by the beam shaping apparatus 42 for dissipating heat resulting from changing the shape of the laser beam.

During a metal cutting operation, a resolver control 63 is responsive to energization of the tachometer generators 19 and 33 as schematically indicated by conduits 64 and 65. In accordance with the energization of the servo motors 18 and 32 and the resulting energization of tachometer generators 19 and 33, the reolver control 63 is so activated as to provide a control signal along conduit 67 to energize the resolver 50, the latter being connected via the conduit 49 to supply a control signal for controlling the angular orientation of the servo motor 47.

Energization of the tachometer generators 19 and 33 likewise operates to provide signals along the conduit 65 to operate a feedback control 70 connected via a conduit 71 to transmit feedback control signals to the servo control system 55. Feedback control signals along the conduit 71 control the operation of the servo motors 18 and 32 in accordance with the input command signals from the numerical control system 52.

Figure 2:
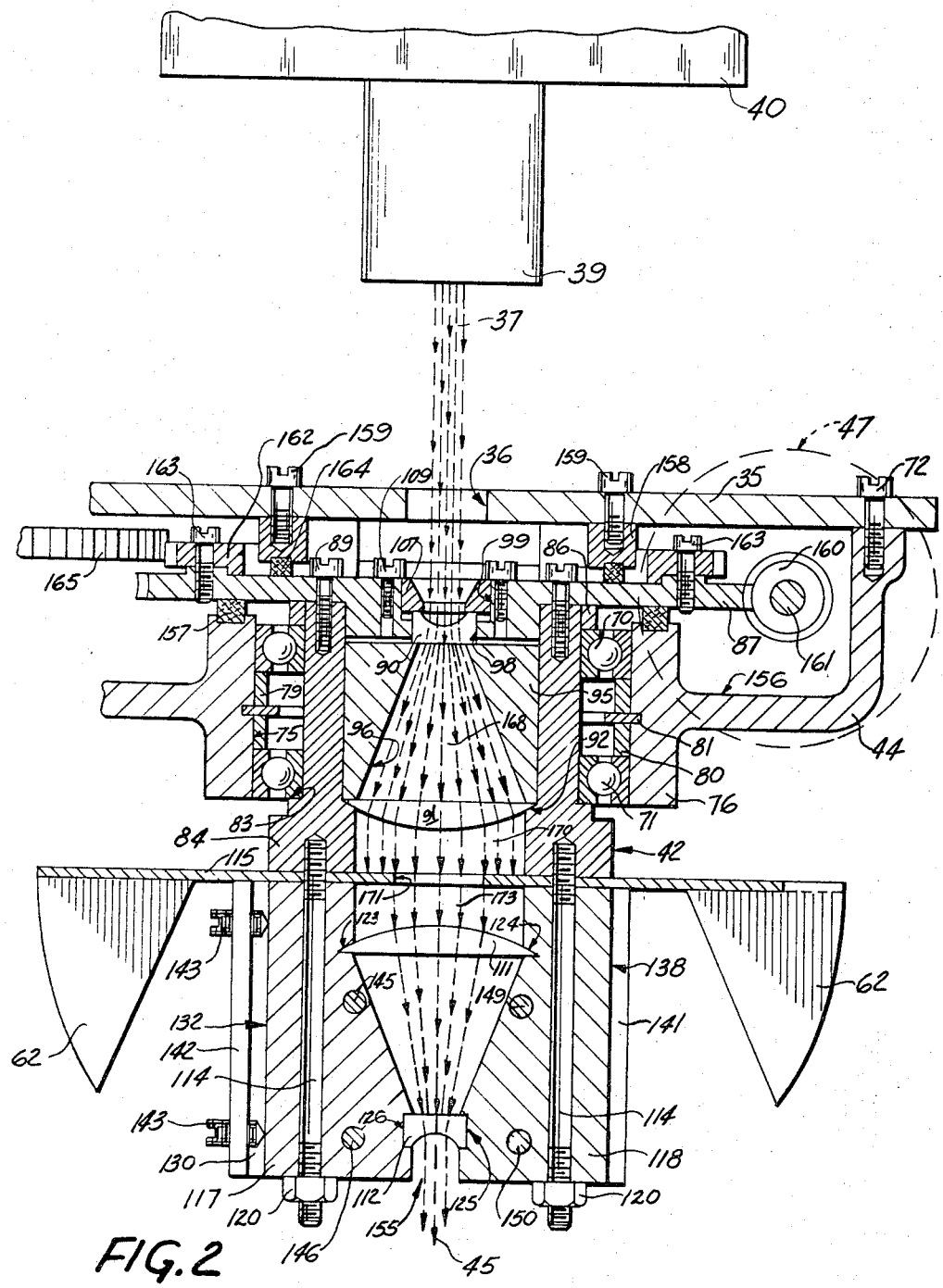
FIG. 2 is an enlarged detailed view, partly in front elevation and partly in longitudinal vertical section, through the laser beam shaping and beam orienting apparatus.

As more clearly shown in FIG. 2, the beam shaping apparatus 42 is rotatably supported by a pair of vertically spaced bearings 70 and 71 within the stationary housing 44 which is secured to the support plate 35 by screws 72. The outer races of the bearings 70 and 71 are carried within a vertically bored opening 75 formed within the lower central flanged portion 76 of the housing 44. The outer bearing races engage the opposite outer edges of spacing collars 79 and 80, the inner edges of which abut a retaining ring 81 engaging an annular groove formed in the bored opening in the flanged portion 76.

The inner race of the lower bearing 71 is maintained in abutting engagement with a circular flanged shoulder 83 presented by a tubular lens support 84. The inner race of the upper bearing 70 is maintained in engagement with the edge of a fitting collar 86 encircling the upper end of the tubular lens support 84, and having its upper edge engaging a side face of a driving worm gear 87.

The worm gear 87 is fixedly secured to the upper end of the tubular lens support 84 by means of fillister head screws 89. The worm gear 87 functions to maintain the tubular lens support 84 in engagement with the inner races of bearings 70 and 71, as well as to retain the spherical lenses 90 and 91 in proper position. As shown in FIG. 2, the peripheral arcuate edge of the lower spherical lens 91 engages a complementary circular and arcuate shoulder 92 integrally formed toward the lower central portion of the tubular lens support 84. The circular planar upper edge of the spherical lens 91 is engaged by the underside of a tubular spacer 95 having an inverted conical opening 96 formed therein. The upper end of the tubular spacer 95 provides a circular shoulder directly engaging the peripheral edge of the underside of the upper spherical lens 90.

The upper spherical lens 90 is maintained in a proper vertically aligned position within a circular opening 98 formed in a central depending hub portion of the worm gear 87. A slightly larger concentric circular opening 99 in the gear 87 is adapted to receive a circular clamp ring 107, the underside of which directly engages the upper peripheral edge of the spherical lens 90. A plurality of peripherally spaced clamp screws 109 threadedly engage suitably tapped openings in the hub portion of the gear 87 in position that the heads thereof maintain the circular clamp ring 107 in proper clamping engagement with the upper spherical lens 90. Downward clamping pressure exerted on the peripheral upper edge of the lens 90 is thus transmitted to the tubular spacer 95, the lower end of which is thereby retained in clamping engagement with the upper peripheral edge of the lower spherical collimating lens 91.

The upper two spherical lenses 90 and 91 are maintained in proper vertical alignment above two lower cylindrical lenses 111 and 112, which cooperate therewith to comprise the optical portion of the beam shaping apparatus 42. To accomplish this, the tubular spherical lens support 84 is provided with four vertically disposed tapped holes that are threadedly engaged by four vertically depending studs 114 spaced in quadrilateral relationship, as shown in FIGS. 2 and 3. The four studs 114 extend through four correspondingly spaced vertical holes formed in a transversely extending beam shaping mask 115 that is maintained in clamped engagement with the lower end of the tubular support 84 by two lens clamping members 117 and 118. Each of the clamp members 117 and 118 is respectively provided with two spaced holes for respectively receiving two of the four clamping studs 114. The two clamp members 117 and 118 are maintained in clamping engagement with the opposite parallel edges of the cylindrical lenses 111 and 112 for cooperating therewith to constitute a unitary optical beam shaping assembly secured to the four studs 114 by four cooperating clamp nuts 120. For gripping the upper lens 111, the spaced apart clamp members 117 and 118 are respectively provided with upper grooves adapted to engage the opposite parallel edges 123 and 124 of the upper cylindrical lens 111. In similar manner, the clamp members 117 and 118 are provided toward their enlarged lower ends with transversely extending rectangular grooves disposed to engage the opposite parallel edges 125 and 126, of the lower cylindrical lens.

For retaining the cylindrical lenses in clamped engagement between the clamp members 117 and 118, the latter are urged toward one another, as shown in FIGS 2 and 3, by two enlarged C-shaped clamps 129 and 130. As shown in FIG. 3, the clamp 129 is provided with a leftward flange 131 that is urged into clamping engagement with a side face 132 of the clamp member 117. The opposite end of the clamp 129 is provided with a cooperating clamping flange 135 having a plurality of tapped holes respectively engaged by clamp screws, only one clamp screw 136 being shown in FIG. 3. The clamp screw 136 is urged into clamped engagement with a side face 138 of the clamp member 118, thereby urging the flange 131 into clamped engagement with the member 117.

In a similar manner, the clamp 130 is provided with a flange 141 and a cooperating flange 142 having a plurality of tapped holes, as shown in FIGS. 2 and 3, adapted to receive clamp screws 143. For cooperating with the clamp 129 to provide an equalized lens clamping pressure, the clamp screws 143 are urged into clamping engagement with the face 132 of the lens clamp member 117 thereby urging the clamp flange 141 into clamping engagement with the side face 138 of the clamp member 118.

For maintaining the C-shaped clamp members 129 and 130 in equalized clamping engagement with the lens clamp members 117 and 118, each of the latter is provided with a pair of vertically spaced, transversely bored holes. As shown in FIGS. 2 and 3, the bored holes in the clamp member 117 are adapted to receive a pair of transversely extending clamp bolts 145 and 146, both of which are disposed to extend through correspondingly spaced bored holes formed in the respective clamp members 129 and 130. In similar manner, the transverse bored holes in clamp member 118 are adapted to receive transversely extending clamp bolts 149 and 150 which likewise extend through correspondingly spaced bored holes in the oppositely disposed clamps 129 and 130.

As shown in FIG. 3, the head 147 of clamp bolt 146 is urged into clamping engagement with a side face of the clamp 129 as the clamp nut 148 is urged into clamping engagement with a side face of the clamp 130. Likewise, the head 151 of clamp bolt 150 is urged into clamping engagement with a side face of the clamp 130 as the clamp nut 152 is urged into clamping engagement with a side face of clamp 129. It will be apparent that the upper clamp bolts 145 and 149, FIG. 2, are secured in a similar manner.

As shown in FIGS. 2 and 3, the lower inner edges of the lens clamp members 117 and 118 are spaced apart a sufficient distance to provide a rectangular slotted opening 155 through which the rectangular or "chisel shaped" laser beam 45 is emitted. In FIG. 3 there is represented the generally rectangular configuration of the cylindrical lenses 111 and 112, as well as an enlarged cross-sectional view of the rectangular output beam 45 transmitted therethrough. As hereinbefore explained, it will be apparent that the clamp members 117 and 118 are retained in clamped engagement with the two cylindrical lenses 111 and 112 to constitute a unitary assembly that is fixedly secured to the rotatable tubular lens support 84 for cooperating therewith to constitute the unitary beam shaping apparatus 42.

For selectively rotating the entire beam shaping apparatus 42, the worm wheel 87 is engaged by a cooperating worm 160 secured to the servo motor drive shaft 161 of the servo motor 47. To provide proper lubrication to the intermeshing worm 160 and worm wheel 87, it will be understood a sump 156, formed within the housing 44, is adapted to receive lubricating oil (not shown) from the usual oil filter opening (not shown). Further, the upper edge of the circular housing flange 76 is provided with a circularly extending rectangular recess adapted to receive a continuous felt oil seal 157. With its upper edge, the circular felt seal 157 frictionally engages a side face of the worm wheel 87. Above the worm wheel 87, as shown in FIG. 2, a circular depending retaining collar 158 is secured to the support plate 35 by means of screws 159. On its underside, the depending collar 158 is provided with a rectangular recess adapted to receive a continuous circular felt oil seal 164 maintained in frictional engagement with the upper side face of the worm wheel 87. Thus, the two oil seals 157 and 164 constrain lubricating oil within the housing oil sump 156. An enlarged spur gear 162 secured to the worm gear 87 by screws 163 is connected to rotate an intermeshing pinion 165, FIG. 2, for driving the rotor 166 of the resolver 50, FIGS. 1 and 5, to a null position in response to rotation of the angular positioning servo motor 47.

As shown in FIG. 2, the generally circular output beam 37 from the laser 39 is directed through the aperture 36 to the upper spherical lens 90 which projects a conically diverging beam 168 to the spherical lens 91. The enlarged beam 168 is transmitted by the spherical lens 91 into an enlarged collimated beam 170 of considerably less intensity than the entrant laser beam 37. The less intense collimated beam 170 is directed toward a rectangular opening 171 presented toward the central portion of the mask 115. With the enlarged laser beam 170 of reduced intensity, as shown in FIG. 2, it will be apparent that the rectangular opening 171 is considerably larger than the concentrated rectangular output beam 45 emitted from the lower cylindrical lens 112. In order to change the shape of the enlarged circular beam 170, extraneous portions of the circular beam are stopped by the mask 115 as graphically illustrated in FIG. 2. In spite of the enlarged beam 170 being of reduced intensity, considerable heat is still generated in the mask 115 which functions to stop those extraneous portions of the beam that are not directed through the enlarged rectangular beam shaping opening 171 formed therein. The mask 115 is preferably formed of metal, such as copper, and is integrally formed with the plurality of radially extending heat dissipating fins 62. The enlarged width of the enlarged rectangular beam shaping opening 171 is illustrated in FIG. 2.

After passing through the rectangular opening 171, the resulting enlarged rectangular beam 173 is directed to the upper cylindrical lens 111 which directs a rectangularly shaped converging beam toward the lower cylindrical lens 112. The beam is transmitted by the lower cylindrical lens 112 as the intense, well collimated and rectangularly shaped laser beam 45.

As hereinbefore explained with reference to FIG. 1, the laser 39 is of the high powered ruby type adapted to emit a high powered coherent beam for cutting metal. As known in the art, laser is an acronym for light amplification by stimulated emission of radiation.

A high powered ruby type laser 39, that may be used as a source for a metal cutting light beam, is illustrated in FIG. 4. A ruby rod 176 is carried within a tubular housing 177 in spacing collars 179 and 180 to constitute the active laser element. At its leftward end, the ruby rod 176 is provided with a semi-transparent partial reflector 181.

At its opposite end, the ruby rod 176 is adapted to project outwardly an intense light beam toward a beam expanding lens system comprising the concentrically disposed lenses 182 and 183 both of which are carried in fixedly spaced relationship within the tubular housing 177. As shown, the lens 182 is mounted in a spacing collar 184. The rightward end 185 of the ruby rod 176 is completely transparent to allow free egress of the beam 188 which is transmitted by the lens 182 into an outwardly diverging beam 189, the latter being transmitted by the lens 183 into an enlarged collimated beam 190. The enlarged beam 190 is directed toward the totally reflective mirror 191 fixedly carried within the rightward end of the tubular housing 177, as shown in FIG. 4. From the totally reflective mirror 191, a coincidental return beam is reflectively projected toward the lens 183, the latter functioning to reversibly project a coincidental converging beam toward the lens 182. The lens 182, in turn, functions to transmit a coincidental collimated beam 188 of reduced cross-sectional area to the end 185 of the ruby rod 176.

Upon energizing the ruby rod 176, the resulting light is reflected back and forth between the semi-transparent, partial reflector 181 at the left end of the ruby rod, and the greatly enlarged totally reflective mirror 191. As the light is reflected between the partial reflector 181 and the enlarged total reflector 191, the amplitude of the light increases until a burst of extremely high intensity, coherent light is emitted by the semi-transparent partial reflector 181, as the generally circular output beam 37. During the process of the light being internally reflected, the intensity of the reflected light is continuously increased. During this period of light amplification, the beam expanding lens system, comprising lenses 182 and 183, effectively enlarge a portion of the inter-reflected beam to reduce the heat and intensity of light incident upon the totally reflective mirror 191.

To activate the ruby rod 176 for producing light, there is provided a flash lamp 194 connected in well-known manner via conductors 195 and 196 to be selectively energized by the usual power supply circuit 59, as schematically indicated in FIG. 4. Although not shown in the drawings, it will be apparent that a laser of the ruby type can be provided that does not incorporate the beam expanding lens system (lenses 182 and 183), and the totally reflective separate mirror 191, shown in FIG. 4. In such a laser (not shown), the rearward or rightward end of the ruby rod would be provided with a total integrally formed reflector in a manner that the light amplification would take place entirely within the ruby rod.

Figure 5:
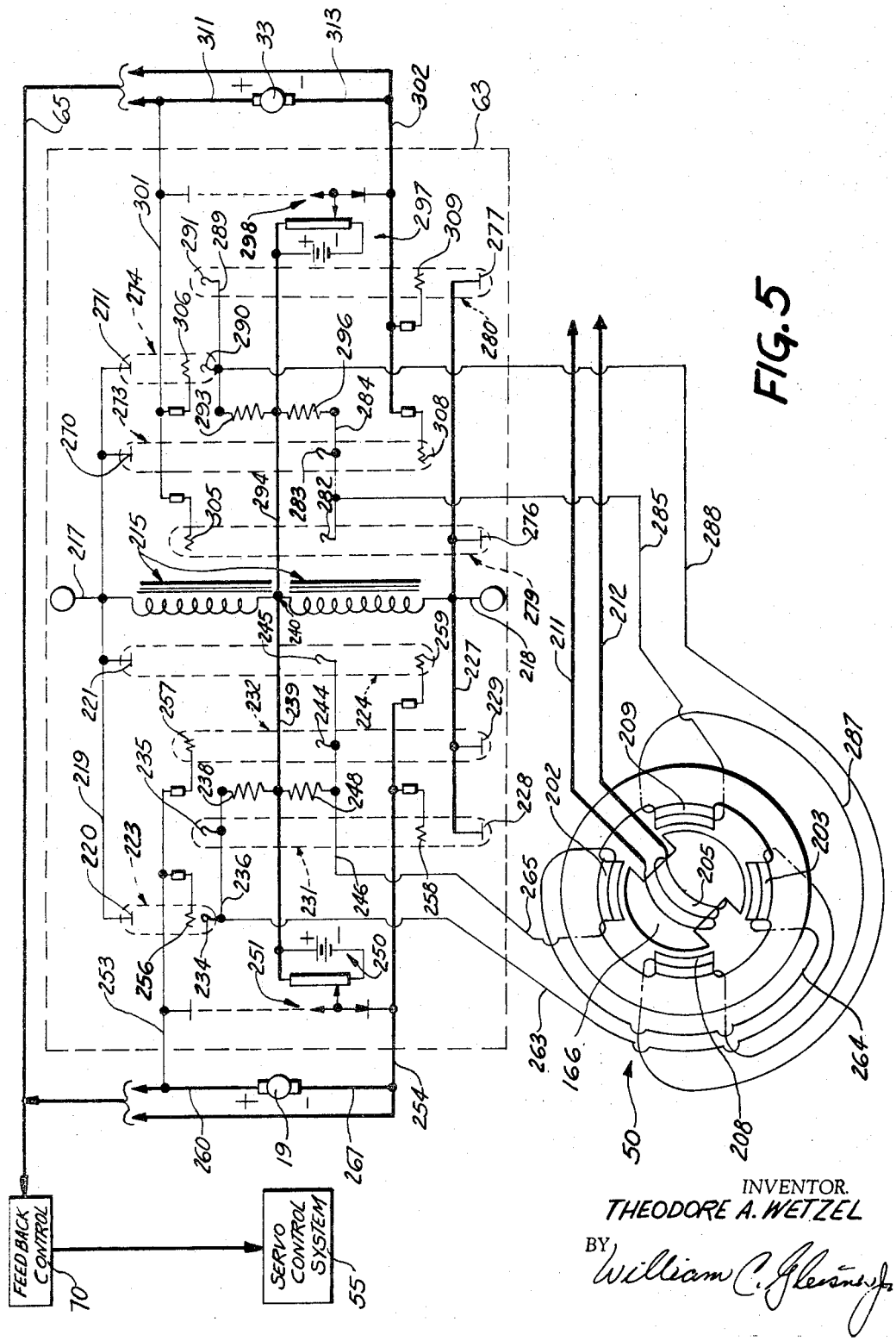
FIG. 5 is a fragmentary schematic view of an electrical control circuit for angularly orienting the beam shaping apparatus.

In FIG. 5, there is represented a schematic diagram of a circuit for controlling the energization of the resolver 50 to provide an output control signal for properly orientating the rotatable beam shaping apparatus 42, FIGS. 1 and 2. Whenever the tachometer generator 19, associated with the X axis is energized, stator windings 202 and 203 of the resolver 50 are energized, in turn, to effect energization of the winding 205 of the resolver rotor 166. In a similar manner, energization of the tachometer generator 33 effects completion of a control circuit for energizing the stator windings 208 and 209 of the resolver 50 to effect a correspondingly proportionate energization of the winding 205 of the resolver rotor 166. Upon selective energization, the resulting control signal from the rotor 166 of the resolver 50 is transmitted via output conductors 211 and 212. The conductors 211 and 212 continue within the conduit 49, FIG. 1, to provide an energized control signal for effecting the required energization of the servo motor 47. In response to the corrective signal, the servo motor 47 is caused to rotate for effecting proper angular orientation of the rectangular beam shaping apparatus 42, and concomitantly therewith, rotation of the resolver rotor 166 to a null position, thereby stopping rotation of the servo motor 47.

Power for selectively energizing the stator windings of the resolver 50 is derived from a center tapped winding 215 or inductor that is interconnected between A.C. power supply lines 217 and 218. An energized conductor 219 is connected to maintain the proper level of voltage on the plates or anodes 220 and 221 of vacuum tubes 223 and 224. In a similar manner, an energized conductor 227 is connected to maintain the proper voltage level on the plates 228 and 229 of the vacuum tubes 231 and 232.

The cathodes 234 and 235 of tubes 223 and 231 are connected via a common conductor 236 to a resistor 238 having its opposite terminal connected to an energized conductor 239 which is connected to the center tap 240 of the energized winding or inductor 215. Likewise, the cathodes 244 and 245 of tubes 232 and 224 are connected via a common conductor 246 to a resistor 248 having its opposite terminal connected to the energized conductor 239.

A battery 250 and rectifier 251 are interconnected between conductors 253 and 254 which are respectively connected to maintain a negative bias on the vacuum tube control grids 256 and 257, as well as the control grids 258 and 259. Thus, in the absence of voltage from the tachometer generator 19, none of the vacuum tubes 223, 224, 231 and 232 are conductive, and consequently, the stator windings 202 and 203 remain in deenergized condition.

Upon rotation of the tachometer generator 19 in one direction, control voltage along the conductors 260 and 253 renders the control grids 256 and 257 more positive, and consequently, the vacuum tubes 223 and 232 are then conductive. With this condition existing, one energized circuit is completed from conductor 219 via plate 220 and cathode 234, thence along the conductor 263 to one terminal of the stator winding 203, connected via a conductor 264 to the stator winding 202; this circuit continues along a conductor 265, and resistor 248, to the energized conductor 239. During the alternate half cycle, a circuit is completed from the energized conductor 227, via the plate 229 and cathode 244 of the tube 232 to the conductor 265. This energized circuit continues through the stator winding 202, conductor 264, and the stator winding 203 to the conductor 263; the latter conductor 263 being connected to complete the energized circuit via the conductor 236, and the resistor 238 to the conductor 239.

In a similar manner, upon rotation of the tachometer generator 19 in the opposite or counterclockwise direction, the vacuum tubes 223 and 232 are non-conductive, and voltage is transmitted along conductors 267 and 254 to render the vacuum tube control grids 258 and 259 more positive. With the control grids 258 and 259 more positive, the respectively associated vacuum tubes 231 and 224 are rendered conductive to again energize the stator windings 202 and 203 in a manner similar to that hereinbefore described. Inasmuch as the vacuum tube plates 229 and 221 are respectively energized by conductors 227 and 219 respectively, the associated tubes 231 and 224 are alternately operative to complete circuits for effecting corresponding energization of the stator windings 202 and 203. A first circuit, for example, is completed from the energized conductor 227, via plate 228, cathode 235, and conductor 236 to conductor 263 connected to energize windings 203 and 202. During this condition, the return circuit from the winding 202 is completed via conductor 265, and resistor 248, to the energized conductor 239. During the alternate half cycle, the vacuum tube 224 is operative to complete a circuit from energized conductor 219, plate 221, cathode 245, conductors 246 and 265 to windings 202 and 203 respectively. This return circuit from the winding 203 is then completed via the conductors 263, 236, and the resistor 238 to the energized conductor 239.

As shown in FIG. 5, the circuit for effecting energization of the stator windings 208 and 209 is spaced rightwardly from the center tapped winding 215. Energized conductor 219 is connected to supply current of the proper voltage to the plates 270 and 271 of vacuum tubes 273 and 274, and conductor 227 is connected to supply current of the proper level to plates 276 and 277 of vacuum tubes 279 and 280.

The cathodes 282 and 283 of tubes 279 and 273 are connected to a conductor 284 that is connected via a conductor 285 connected to one terminal of the stator winding 209. The stator winding 209 is connected via a conductor 287 to the stator winding 208 which, in turn, is connected to a conductor 288. From the conductor 288, the circuit continues via a common conductor 289 to the cathodes 290 and 291 of the vacuum tubes 274 and 280.

The common conductor 289 is connected via a resistor 293 to an energized conductor 294 connected to the center tap 240 of the energized winding 215. In like manner, the common conductor 284 is connected via a resistor 295 to the energized conductor 294.

A battery 297 and rectifier 298 are interconnected between the conductors 301 and 302 which are respectively connected to supply a negative bias to the vacuum tube grids 305 and 306, as well as to the grids 308 and 309. With this condition existing, none of the vacuum tubes 273, 274, 279 and 280 are conductive, and the stator windings 208 and 209 are retained in deenergized condition.

Whenever the tachometer generator is rotated in a clockwise direction, a circuit is completed along conductors 311 and 301 to render the control grids 305 and 306 more positive and to render the tubes 279 and 274 conductive. During this condition, a first circuit is completed from the energized conductor 219 via the plate 271 of the tube 274, and the cathode 290 to the conductor 288. This circuit continues via the winding 208, conductor 287, and winding 209 to the conductor 285. The circuit from conductor 285 continues via the common conductor 284, and the resistor 296 to the energized conductor 294. During the alternate half cycle, the energized circuit is completed from the energized conductor 227 via the plate 276 and cathode 282 of the tube 279 to the conductors 284 and 285 to the winding 209. From the stator winding 209, the circuit continues along conductor 287, the winding 208, and thence via the conductor 288, common conductor 289, and the resistor 293 to the energized conductor 294.

Whenever the tachometer generator 33 is rotated in the opposite or counterclockwise direction, voltage is transmitted along conductors 313 and 302 to render control grids 308 and 309 more positive, thereby rendering the associated tubes 273 and 280 conductive. With this condition existing, energized circuits again are alternately effected via the vacuum tubes 273 and 280 for energizing the stator windings 208 and 209 of the resolver 50.

Although the exemplary embodiments of the invention have been described in considerable detail in order to fully disclose practical operative apparatus incorporating the invention, it is to be understood that the particular structures shown and described are illustrative only, and that the various characteristics of the invention may be incorporated in other structural forms without departing from the spirit and scope of the invention as defined in the subjoined claims.

The principles of this invention having now been fully explained, I hereby claim as my invention:

1. In a machine tool having a base:
   a laser cutting head and a work support carried for relatively transverse movement in parallel planes;
   a laser carried by said head adapted to project a metal cutting light beam along an axis perpendicular to the plane in which said work support is movable;
   a rotatable beam shaping apparatus carried by said cutting head for receiving the beam from said laser;
   a beam enlarging lens system in said apparatus adapted to enlarge the laser beam for reducing the intensity;
   a lens shaping system and rectangularly apertured mask carried by said lens shaping apparatus adapted to receive the enlarged beam and change the received beam into a reduced size beam of rectangular cross-section;
   a beam refocusing lens system in said apparatus to reduce the area of the enlarged beam of rectangular cross section and into an intense collimated rectangular beam for metal cutting;
   separate power drives respectively operable to move said cutting head and said work support in selected directions along said base;
   a positioning drive connected to angularly position said rotatable beam shaping apparatus for orienting the rectangular laser output beam in desired angular position; and,
   control means responsive to operation of said separate power drives for actuating said positioning drive for effecting angular positioning movement of said beam shaping apparatus.

2. In a laser machining tool having a base and a cutting head carried thereby, a high powered laser carried by said head and operative to project a generally circular metal cutting laser light beam;
   a laser beam shaping apparatus carried by said head comprising;
   a spherical lens system axially aligned to receive and enlarge the circular output beam from the laser to a less intense beam of enlarged circular cross-section;
   a mask having a generally rectangular opening axially adapted to convert the enlarged circular beam to a beam of rectangular shape by masking the peripheral edges of the enlarged beam;
   a cylindrical lens system axially aligned with said mask in position to receive the enlarged rectangular laser beam from said mask and being operative to project an intense well collimated rectangular laser light beam of greatly reduced cross-sectional area;
   a rotatable support adapted to carry said beam shaping apparatus in said head angularly orienting the rectangular output beam therefrom;
   a work support movable on said base and adapted to carry a workpiece for a laser cutting operation;
   a power drive operative to effect selective directional movement of said work support; and,
   a power positioner operable to effect angular positioning movement of said rotatable support for angularly orienting the rectangular laser output beam from said beam shaping apparatus in accordance with the direction of movement effected by said power drive for said work support.

3. In a machine tool having a base and a movable support carried thereby;
   a laser carried by said support and being adapted to project a circular metal cutting output beam;
   a beam shaping apparatus axially aligned with the circular output beam from said laser and being carried by said movable support for rotational positioning movement about the axis of the beam;
   a spherical lens system carried by said apparatus and being axially aligned to enlarge the laser beam for reducing its intensity;
   a mask carried by said apparatus and having a rectangular opening axially interposed in the path of the enlarged beam to produce an enlarged beam of rectangular cross-section by intercepting the peripheral portions of the enlarged beam;
   a cylindrical lens system carried by said apparatus in position axially aligned to receive the enlarged rectangular beam from said mask and being operative to refocus the enlarged rectangular beam into a collimated laser beam of relatively small rectangular cross-section for cutting a slot of corresponding rectangular size in a workpiece;
   a worktable carried by said base for rectilinear movement relative to the rectangular shaped laser output beam from said cylindrical less system of said beam shaping apparatus; and,
   separate power drive means connected to effect selective rectilinear movement of said movable laser support and said worktable, and means for effecting coordinate rotational positioning movement of said beam shaping apparatus.

4. In a machine tool according to claim 3 including cooling fins carried by said mask for transferring heat away from the light passing aperture formed therein.

5. In combination with a machine having a laser support:
   a laser carried by said support and being operative to project a circular metal cutting light beam;
   a spherical lens system carried by said support in axially aligned position to receive the circular light beam from said laser and projected as an enlarged beam of considerable less density;

a mask axially depending from said lens system and having a rectangular aperture operative to change the shape of the enlarged circular light beam to a beam of rectangular cross section by masking that part of the beam not passing through the aperture;

heat transfer cooling means carried by said mask for reducing the concentration of heat around the aperture formed therein; and, a cylindrical lens system axially depending beneath said mask and operative to refocus the rectangular beam therefrom into a converging collimated light beam of intense rectangular configuration for performing metal cutting operations.

6. In combination with a machine having a support:

a laser carried by said support and operative to project substantially circular metal cutting light beam;

a first lens system axially depending from said support to receive and then project the circular received beam from said laser into an enlarged collimated circular beam of less intensity;

a cooperating mask depending from said first lens system and having a rectangular aperture axially aligned to mask the enlarged circular light beam into a smaller light beam of rectangular configuration;

cooling fins carried by said mask adapted to transfer heat from the vicinity of the aperture in said mask; and, a second lens system axially depending from said mask in said first lens system for operation to refocus the rectangular beam as a converging intense collimated beam of reduced rectanglar shape for performing a metal configuring operation.

References Cited

UNITED STATES PATENTS

| | | | |
|---|---|---|---|
| 3,096,767 | 7/1963 | Gresser et al. | 219—121 |
| 3,259,730 | 7/1966 | Wehde et al. | 331—94.5 |
| 3,265,855 | 8/1966 | Norton | 219—121 |
| 3,281,712 | 10/1966 | Koester | 219—121 |
| 3,286,193 | 11/1966 | Koester et al. | 219—121 |

RICHARD M. WOOD, *Primary Examiner.*

W. DEXTER BROOKS, *Assistant Examiner.*

U.S. Cl. X.R.

219—69